(12) United States Patent
Chen

(10) Patent No.: US 8,523,199 B2
(45) Date of Patent: Sep. 3, 2013

(54) STROLLER AND HEADREST-ADJUSTING MECHANISM THEREOF

(75) Inventor: Rui-Bin Chen, Taipei (TW)

(73) Assignee: Wonderland Nurserygoods Company Limited, Central (HK)

(*) Notice: Subject to any disclaimer, the term of this patent is extended or adjusted under 35 U.S.C. 154(b) by 325 days.

(21) Appl. No.: 12/974,880

(22) Filed: Dec. 21, 2010

(65) Prior Publication Data

US 2011/0181025 A1    Jul. 28, 2011

(30) Foreign Application Priority Data

Jan. 26, 2010 (CN) .......................... 2010 1 0110150

(51) Int. Cl.
*B62B 9/12* (2006.01)
*B62B 7/00* (2006.01)

(52) U.S. Cl.
USPC ..... 280/47.41; 280/647; 280/658; 280/47.38; 280/47.4

(58) Field of Classification Search
USPC ........... 280/642, 647, 658, 47.38, 47.4, 47.41
See application file for complete search history.

(56) References Cited

U.S. PATENT DOCUMENTS

| 6,099,021 | A | * | 8/2000 | Benoit | 280/647 |
| 2007/0073464 | A1 | * | 3/2007 | Chen et al. | 701/49 |

* cited by examiner

*Primary Examiner* — J. Allen Shriver, II
*Assistant Examiner* — Bryan Evans
(74) *Attorney, Agent, or Firm* — Foley & Lardner LLP

(57) ABSTRACT

A headrest-adjusting mechanism is adapted for use with a stroller. The stroller includes a headrest-supporting tube and a backrest-supporting tube. The headrest-adjusting mechanism is adapted to be connected between the headrest-supporting tube and the backrest-supporting tube in such a manner to allow for rotation of the headrest-supporting tube relative to the backrest-supporting tube from a usable position to a folded position in a predetermined direction.

17 Claims, 8 Drawing Sheets

STROLLER AND HEADREST-ADJUSTING MECHANISM THEREOF

CROSS-REFERENCE TO RELATED APPLICATION

This application claims priority of Chinese Application No. 201010110150.X, filed on Jan. 26, 2010.

BACKGROUND OF THE INVENTION

1. Field of the Invention

This invention relates to an adjusting mechanism, and more particularly to a headrest-adjusting mechanism for a stroller.

2. Description of the Related Art

Foldable strollers have been proposed. However, most of the foldable strollers (e.g., that disclosed in U.S. Pat. No. 5,752,738) have a relatively large folded volume. Therefore, it is desirable to reduce significantly the folded volume of a foldable stroller.

SUMMARY OF THE INVENTION

The object of this invention is to provide a foldable stroller that has a less folded volume.

According to this invention, a headrest-adjusting mechanism is usable with a foldable stroller. The stroller includes a headrest-supporting tube and a backrest-supporting tube. The headrest-adjusting mechanism is adapted to be connected between the headrest-supporting tube and the backrest-supporting tube in such a manner to allow for rotation of the headrest-supporting tube relative to the backrest-supporting tube from a usable position to a folded position in a predetermined direction. Since the headrest-supporting tube is rotatable relative to the backrest-supporting tube, the folded volume of the stroller can be reduced significantly.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
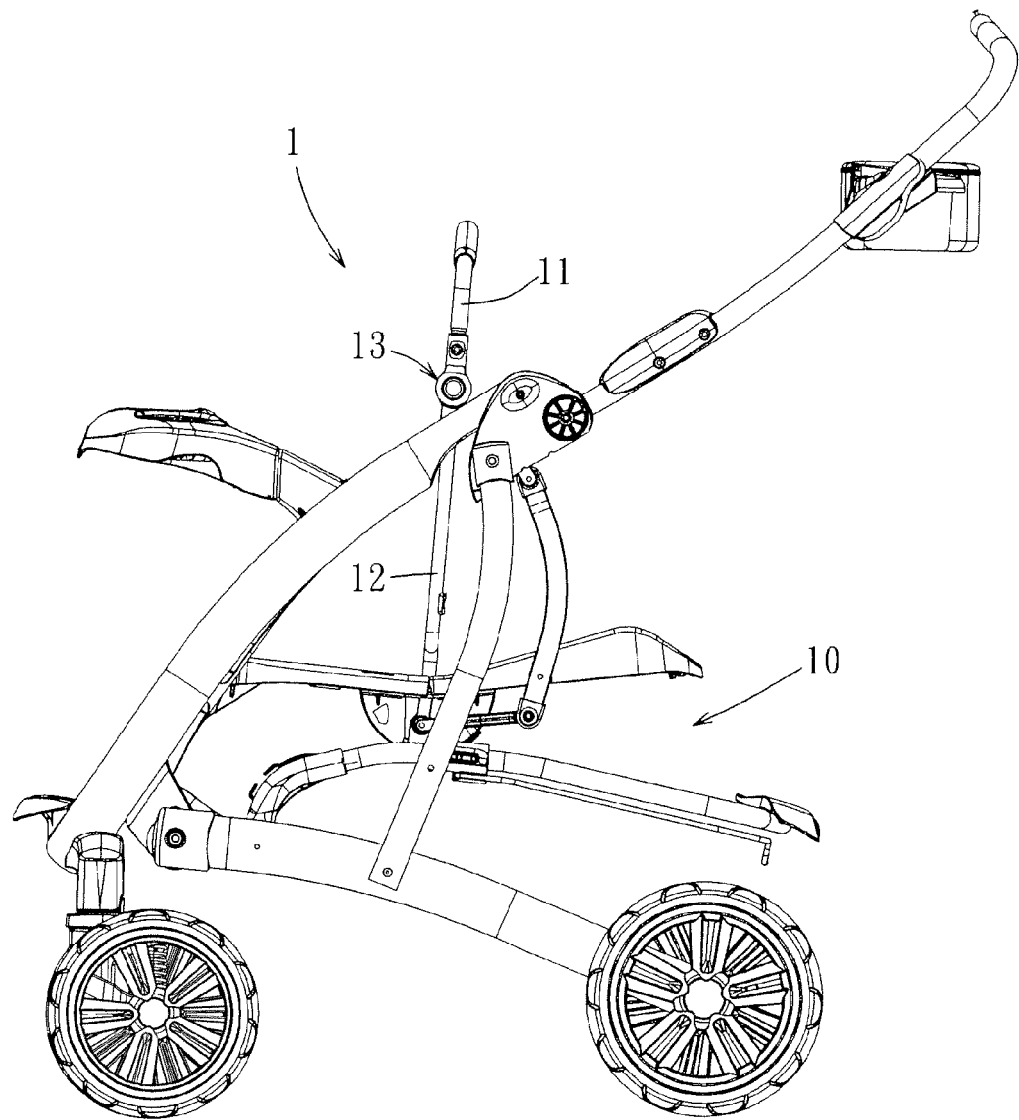
FIG. 1 is a perspective view of the preferred embodiment of a foldable stroller according to this invention when in an unfolded state.
Figure 2:
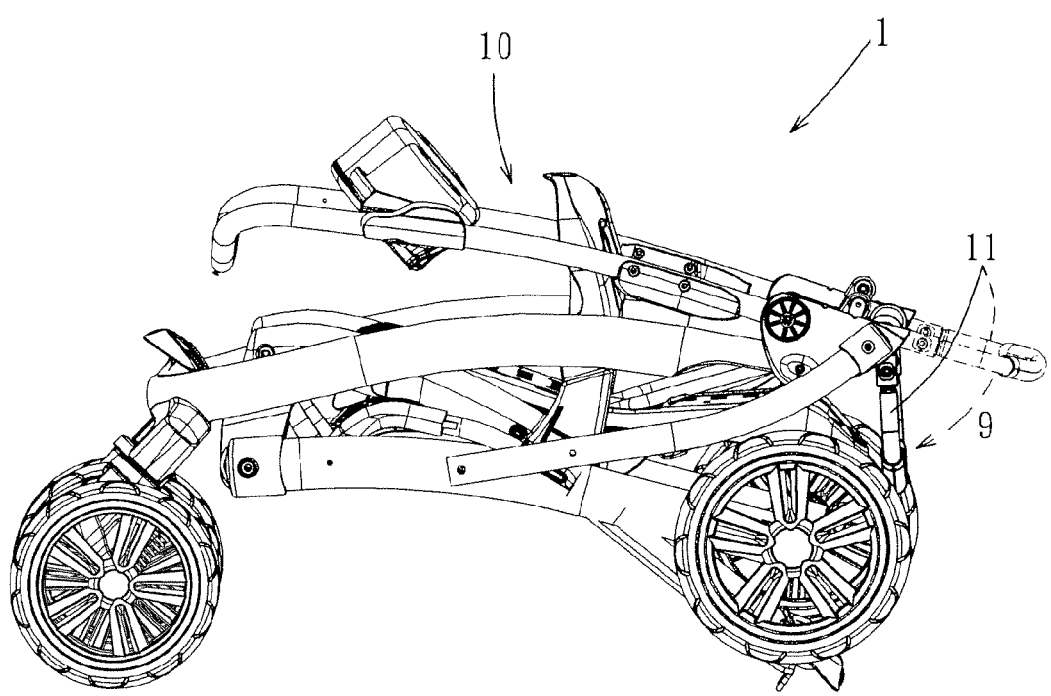
FIG. 2 is a perspective view of the preferred embodiment when in a folded state.
Figure 3:
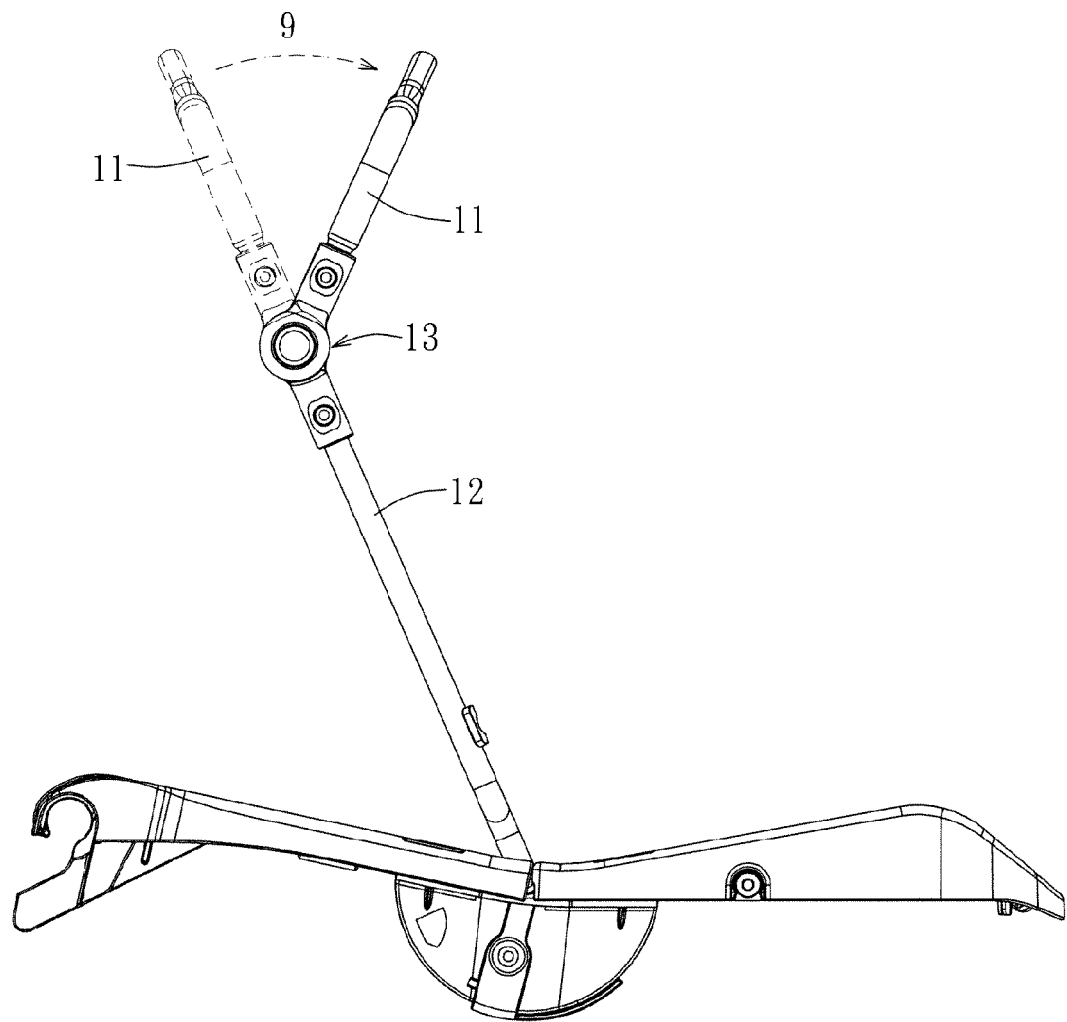
FIG. 3 is a fragmentary side view of the preferred embodiment, illustrating how a headrest-supporting tube is adjustable between two positions.

Referring to FIGS. 1 and 3, the preferred embodiment of a foldable stroller 1 according to this invention includes a frame body 10, two headrest-supporting tubes 11 (only one is shown), two backrest-supporting tubes 12 (only one is shown), and two headrest-adjusting mechanisms 13 (only one is shown). The backrest-supporting tubes 12 are disposed respectively on two opposite sides of the frame body 10. The headrest-supporting tubes 11 are disposed respectively on and above the backrest-supporting tubes 12. Each of the headrest-supporting tubes 11 is connected to the corresponding backrest-supporting tub 12 by the corresponding headrest-adjusting mechanism 13. With additional reference to FIG. 2, when the stroller 1 is in a folded state, the headrest-supporting tubes 11 can be rotated relative to the frame body 10 from a usable position (shown by the phantom lines in FIG. 2) whereat the headrest-supporting tubes 11 project rearwardly from a rear end of the remaining portion of the folded stroller 1 to a folded position whereat rear ends of the headrest-supporting tubes 11 abut against the rear end of the remaining portion of the folded stroller 1 to reduce the space occupied by the folded stroller 1.

Figure 4:
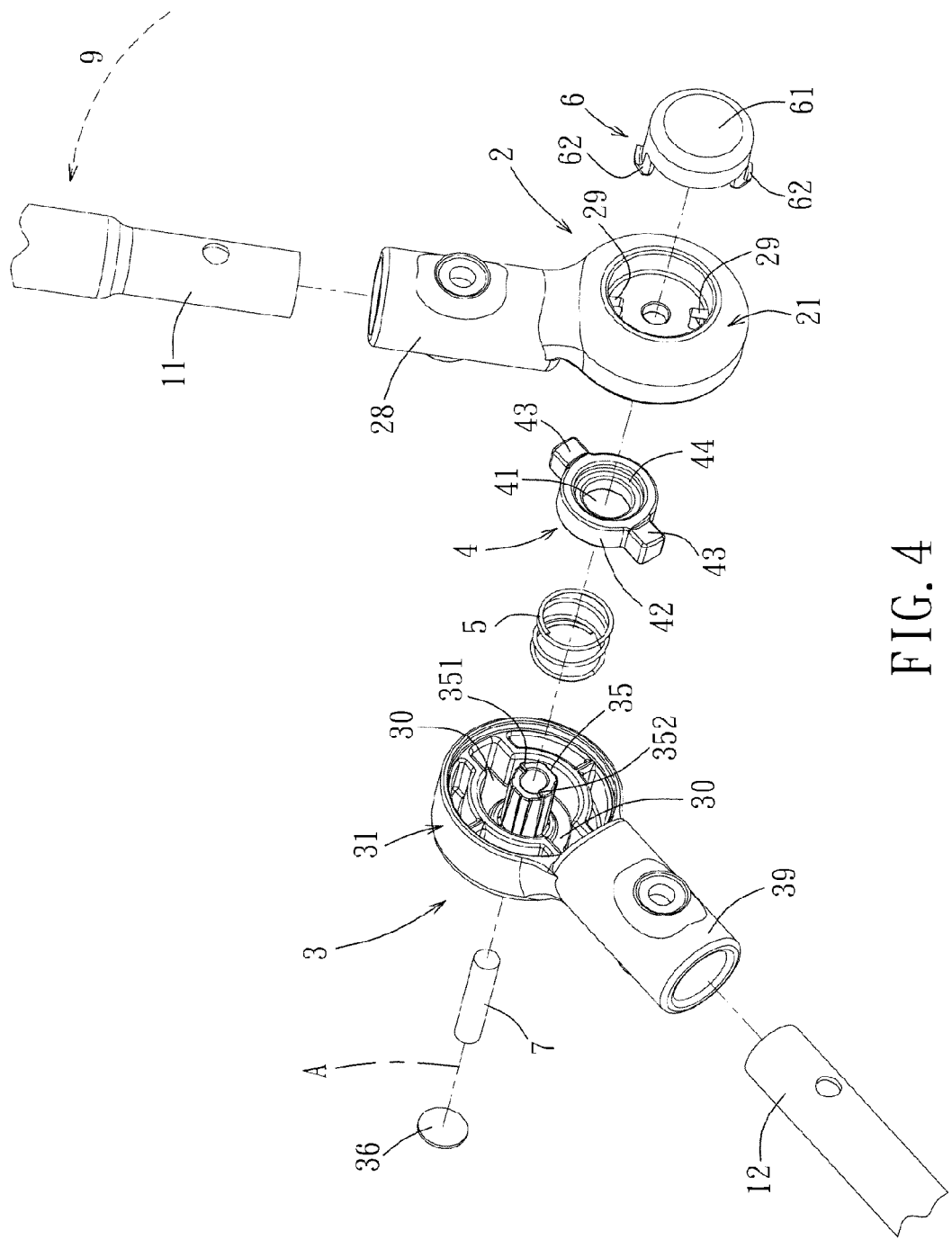
FIG. 4 is a fragmentary exploded perspective view of a headrest-adjusting mechanism of the preferred embodiment.
Figure 5:
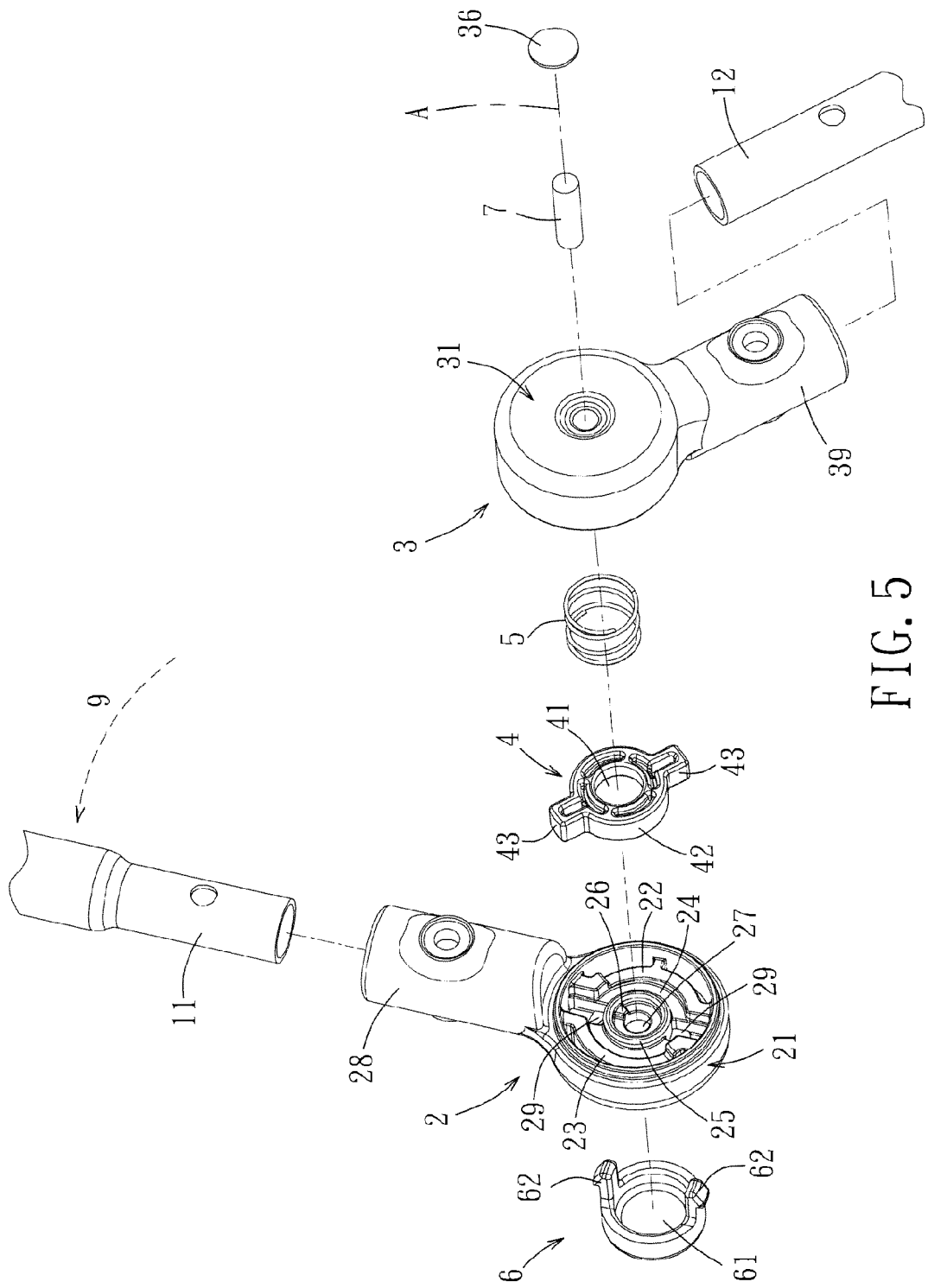
FIG. 5 is a fragmentary exploded perspective view of the headrest-adjusting mechanism of the preferred embodiment, viewed at another angle.
Figure 6:
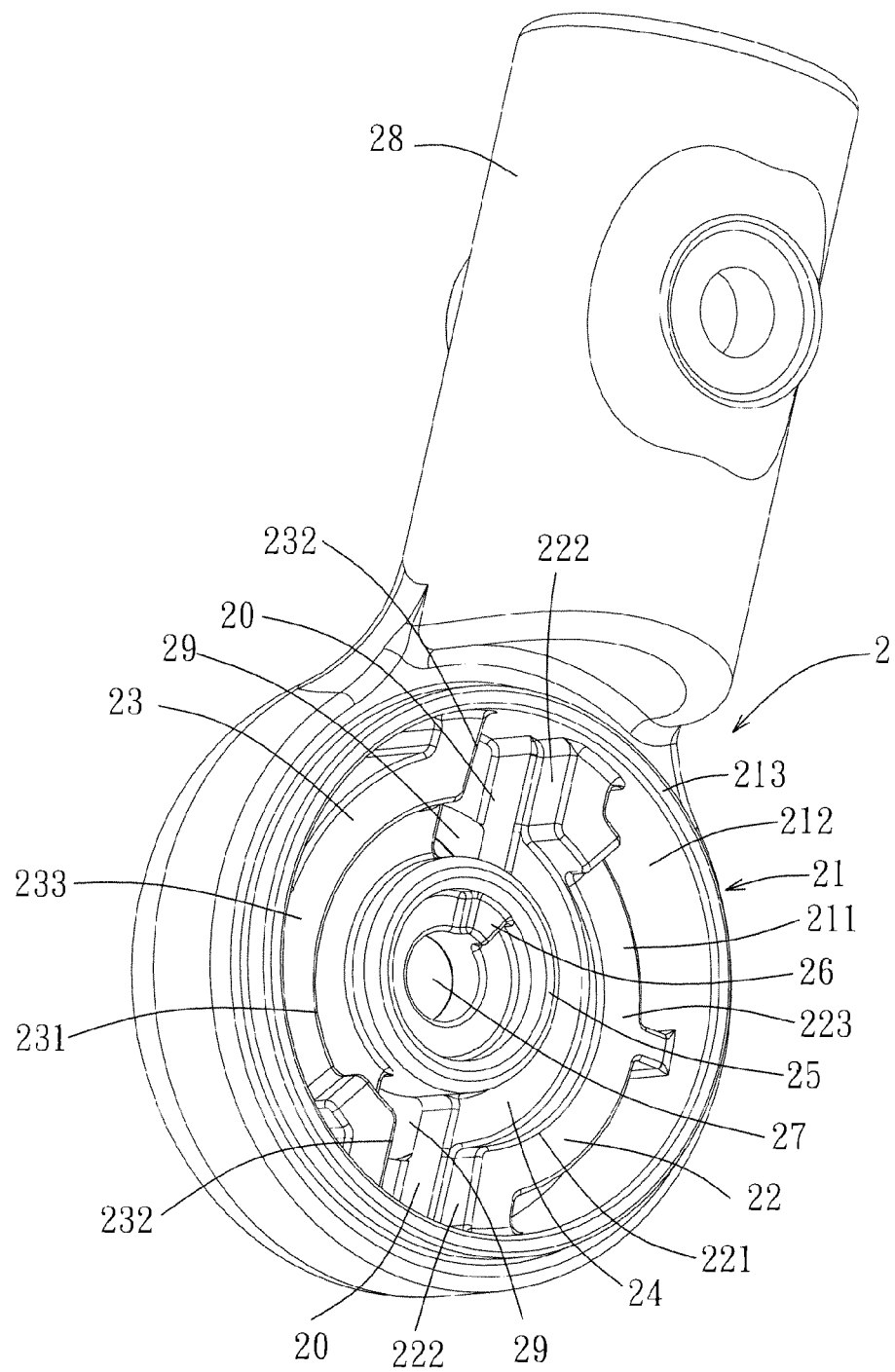
FIG. 6 is a perspective view of a first pivot member of the preferred embodiment.

With further reference to FIGS. 4 and 5, each of the headrest-adjusting mechanisms 13 includes a first pivot member 2, a second pivot member 3, a position-limiting member 4, a coiled compression spring 5, a pushbutton 6, and a shaft 7 extending through the first pivot member 2, the second pivot member 3, the position-limiting member 4, and the spring 5. As such, the first and second pivot members 2, 3 are rotatable relative to each other about an axis (A). One of the headrest-adjusting mechanisms 13 will be described in the succeeding paragraphs.

The first pivot member 2 includes a first pivot body 21, and a first sleeve tube 28 connected to the first pivot body 21. The first sleeve tube 28 is sleeved fixedly on the corresponding headrest-supporting tube 11. The first pivot body 21 has an annular flat wall 211, a surrounding wall 212 extending from an outer periphery of the flat wall 211 toward the second pivot member 2 in an axial direction of the first pivot body 21, and an outer annular rib 213 extending from an outer periphery of an end surface of the surrounding wall 212 in the axial direction of the first pivot member 2. The first pivot member 2 further includes an inner side surface formed with a first curved wall 22 and a second curved wall 23, each of which has a curved inner side 221, 231 and two generally flat end surfaces 222, 232. The first and second curved walls 22, 23 define cooperatively a first retaining groove 24 disposed between the curved inner sides 221, 231, and two radially extending first position-limiting grooves 20 each disposed between the corresponding end surface 222 of the first curved wall 22 and the corresponding end surface 232 of the second curved wall 23 and in spatial communication with the first retaining groove 24. Each of the first and second curved walls 22, 23 has an axial thickness that increases gradually in a clockwise direction. That is, each of the first and second curved walls 22, 23 has an inclined side surface 223, 233 for slidable contact with the position-limiting member 4. The first position-limiting grooves 20 have a depth smaller than the thickness of the position-limiting member 4. The inner side surface of the first pivot body 21 is further formed with an annular flange 25 disposed in the first retaining groove 24, and a retaining block 26 extending inwardly from the annular flange 25. The annular flange 25 has an inner annular rib 25' (see FIG. 8) and an annular shoulder 25" (see FIG. 8) that are adjacent to each other. The first pivot member 2 further includes a first receiving hole 27 formed through the flat wall 211 and disposed inside the annular flange 25, and two through holes 29 formed through the flat wall 211 and disposed outside of the annular flange 25. The first receiving hole 27 permits extension of the shaft 7 therethrough.

Figure 7:
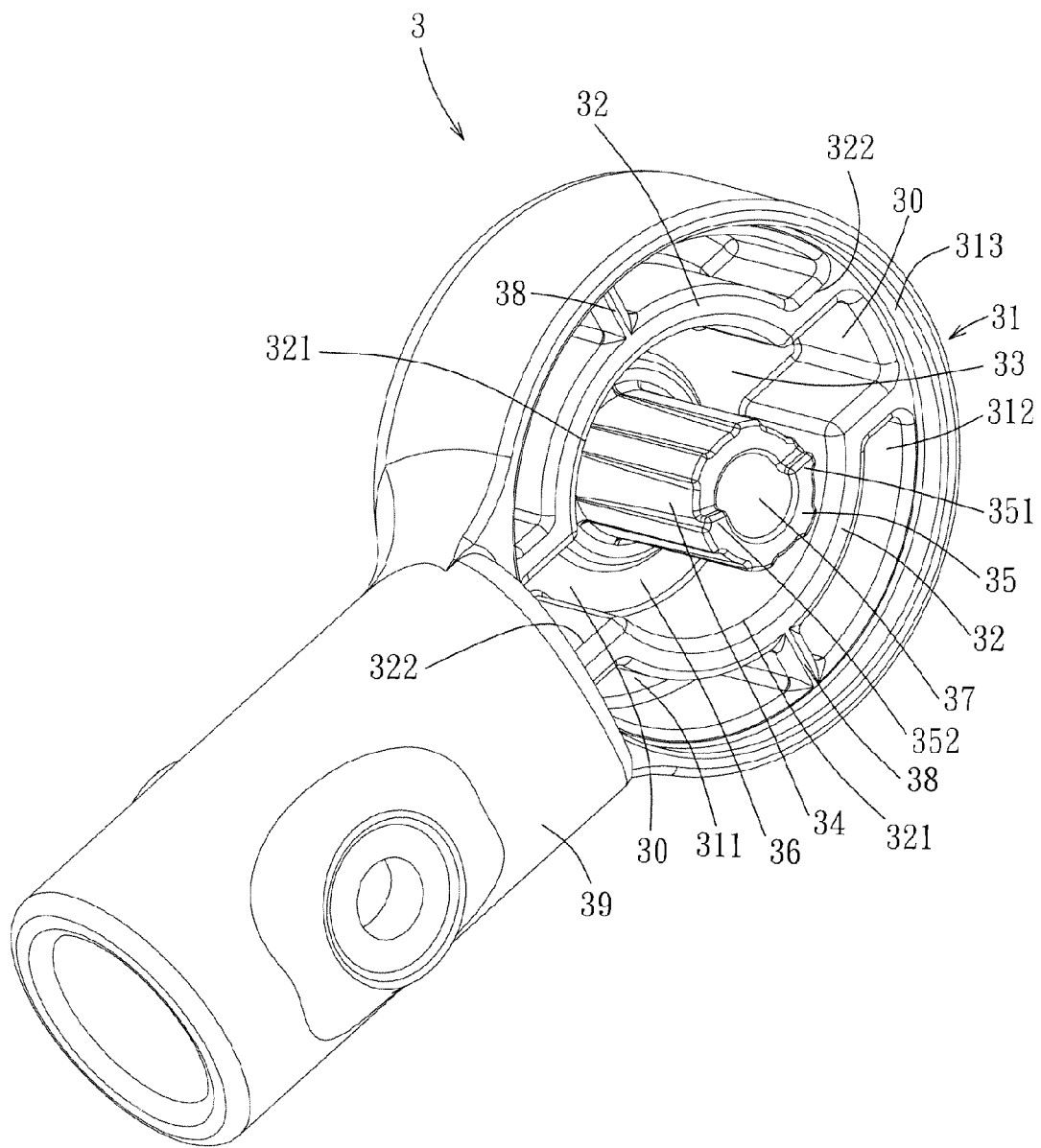
FIG. 7 is a perspective view of a second pivot member of the preferred embodiment.

With further reference to FIG. 7, the second pivot member 3 includes a second pivot body 31 and a second sleeve tube 39. The second sleeve tube 39 is sleeved fixedly on the corresponding backrest-supporting tube 12. The second pivot body 31 includes an annular flat wall 311, a surrounding wall 312 extending from an outer periphery of the flat wall 311 and having an annular shoulder 313. The second pivot body 31 has an inner side surface formed with two spaced-apart third curved walls 32 that are disposed in the surrounding wall 312 and on the flat wall 311. Each of the third curved walls 32 has a curved inner side 321 and two generally flat end surfaces 322. The third curved walls 32 define cooperatively a second retaining groove 33 disposed between the curved inner sides 321, and two second radially extending second position-limiting grooves 30 each disposed between the corresponding end surfaces 322 of the third curved walls 32 and in spatial communication with the second retaining groove 33. The second position-limiting groove 30 has a depth that is greater than the thickness of the position-limiting member 4. The second pivot member 3 further includes a loop-shaped flange 34 extending from the flat wall 311 toward the first pivot member 2 and disposed in the second retaining groove 33. An annular end surface of the loop-shaped flange 34 is formed with a curved limiting projection 35 that has opposite first and second ends 351, 352. The second pivot member 3 further includes a second receiving hole 37 formed through the flat wall 311 and the loop-shaped flange 34 and permitting extension of the shaft 7 therethrough, and two reinforcing plates 38 each connected between the corresponding third curved wall 32 and the surrounding wall 312.

The outer annular rib 213 of the first pivot member 2 abuts against the annular shoulder 313 of the second pivot member 31, and an end of the loop-shaped flange 34 of the second pivot member 3 abuts against the annular shoulder 25" of the first pivot member 2, so that the first and second pivot members 2, 3 are positioned relative to each other. The curved limiting projection 35 of the second pivot member 3 is disposed inside the inner annular rib 25' of the first pivot member 2. When the headrest-supporting tube 11 is disposed at the usable position, the retaining block 26 of the first pivot member 2 abuts against the first end 351 of the curved limiting projection 35. When the headrest-supporting tube 11 is disposed at the folded position, the retaining block 26 abuts against the second end 352 of the curved limiting projection 35. As such, the headrest-supporting tube 11 is limited to rotate from the usable position to the folded position in a clockwise (i.e., rearward) direction 9, and from the folded position to the usable position in a counterclockwise (i.e., forward) direction.

Figure 8:
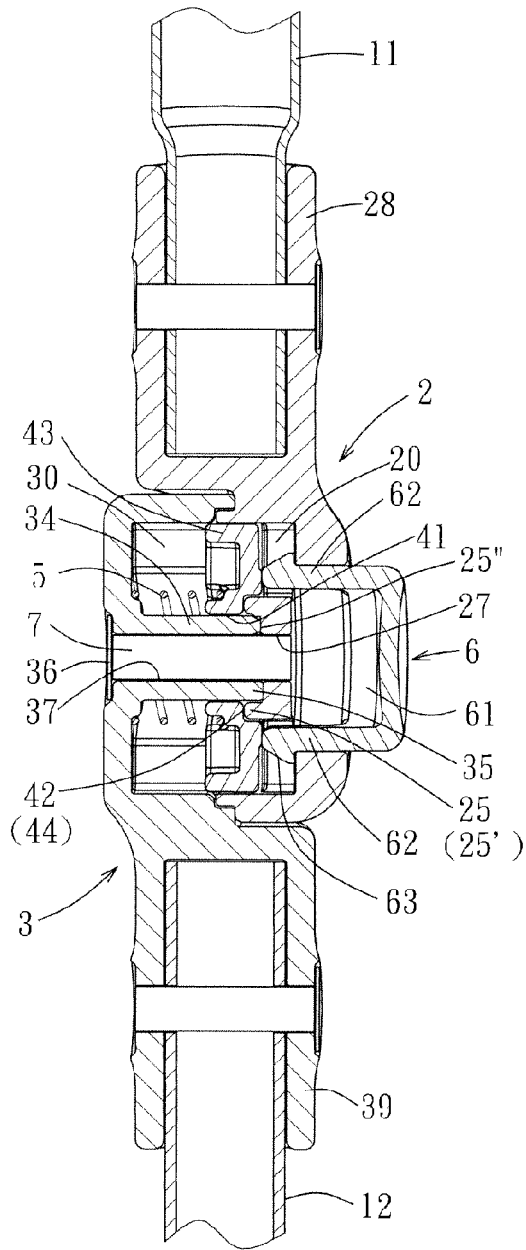
FIG. 8 is a fragmentary schematic sectional view of the preferred embodiment, illustrating how a headrest-supporting tube is in a locked state.

With particular reference to FIGS. 4 and 5, the position-limiting member 4 has an annular body 42 defining a central hole 41, and two diametrically opposed locking portions 43 extending radially and outwardly from the annular body 42 away from each other and having a thickness the same as that of the annular body 42. The central hole 41 permits extension of the loop-shaped flange 34 of the second pivot member 3 therethrough. The annular body 42 has an annular shoulder 44 abutting against the inner annular rib 25' of the first pivot member 2. Each of the locking portions 43 of the position-limiting member 4 is disposed within the corresponding first position-limiting groove 20 in the first pivot member 2 and the corresponding second position-limiting groove 30 in the second pivot member 3 when the headrest-supporting tube 11 is disposed at the usable position. The compression spring 5 is sleeved on the loop-shaped flange 34, and is disposed between and abuts against the position-limiting member 4 and the flat wall 311 of the second pivot body 31 for biasing the locking portions 43 of the position-limiting member 4 away from the second positioning grooves 30 in the second pivot member 3 and toward the first position-limiting grooves 20 in the first pivot member 2. That is, the position-limiting member 4 is biased away from the second pivot member 3 and toward the first pivot member 2. Since the depth of each of the first position-limiting grooves 30 is smaller than the thickness of the position-limiting member 4, a portion of each of the locking portions 43 of the position-limiting member 4 projects from the corresponding first position-limiting groove 20 in the first pivot member 2 into the corresponding second position-limiting groove 30 in the second pivot member 3, as shown in FIG. 8. As a result, the first and second pivot members 2, 3 are locked relative to each other, so that the headrest-supporting tube 11 is in a locked state.

The pushbutton 6 has an actuator portion 61 disposed outwardly of the first pivot member 2, and two barbed arms 62 extend from the actuator portion 61 and through the through holes 29 in the first pivot member 2, respectively, such that the pushbutton 6 is movable relative to the first pivot member 2. Each of the arms 62 has a barb 63 (see FIGS. 8 and 9) at an end thereof. The compression spring 5 biases the position-limiting member 4 to abut against the barbed arms 62, such that barbs 63 engage the flat wall 211 of the first pivot member 21, as shown in FIG. 8.

Figure 9:
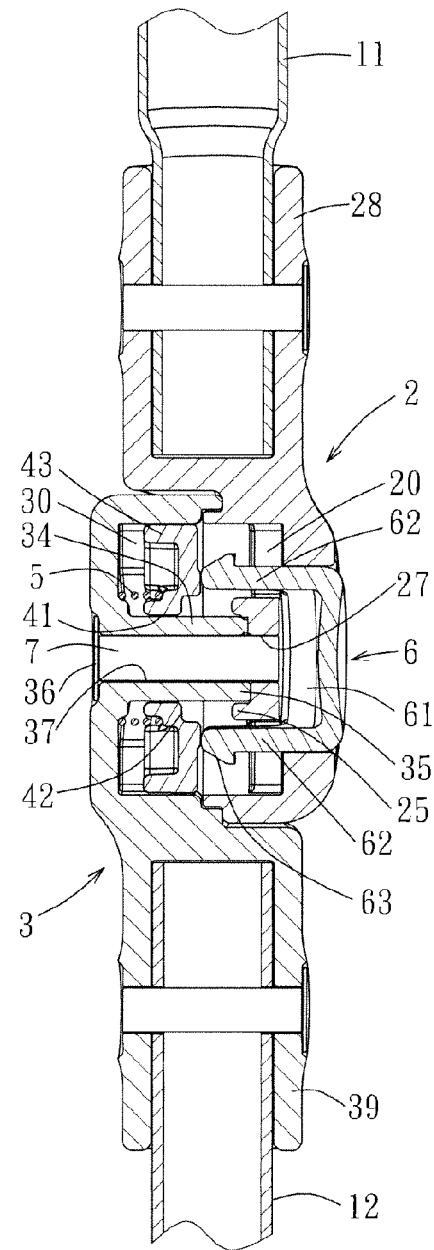
FIG. 9 is a view similar to FIG. 8 but illustrating how the headrest-supporting tube is in a release state.

With further reference to FIG. 9, a pushing force can be applied to the actuator portion 61 against the biasing action of the compression spring 5 so that the barbed arms 62 push and move the whole locking portions 43 of the position-limiting member 4 into the second position-limiting grooves 30, respectively, thereby releasing the first and second pivot members 2, 3 from each other. Hence, the headrest-supporting tube 11 is in a release state. In this state, the headrest-supporting tube 11 can be rotated from the usable position to the folded position in the clockwise direction 9, or from the folded position to the usable position in the counterclockwise direction. Rotation of the headrest-supporting tube 11 between the usable position and the folded position results in movement of the locking portions 43 on the inclined surfaces 223, 233 of the first and second curved walls 22, 23. When the pushing force is released, portions of the locking portions 43 of the position-limiting member 4 are pushed into the first position-limiting grooves 20, respectively, by the compression spring 5, to thereby return the headrest-supporting tube 11 to the locked state.

Since the axial thickness of each of the first and second curved walls 22, 23 of the first pivot member 2 increases gradually in the clockwise direction, as described above, when the headrest-supporting tube 11 is rotated from the folded position to the usable position, the locking portions 43 of the position-limiting member 4 move on the inclined side surfaces 223, 233 of the first and second curved walls 22, 23 of the first pivot member 2 from thin ends of the first and second curved walls 22, 23 toward thick ends of the first and second curved walls 22, 23. Hence, the inclined side surfaces 223, 233 of the first and second curved walls 22, 23 push the whole locking portions 43 of the position-limiting member 4 into the second position-limiting grooves 30, respectively, to thereby allow for further rotation of the headrest-supporting tube 11 from the folded position toward the usable position. As such, the headrest-supporting tube 11 can be rotated forcibly from the folded position to the usable position against the biasing action of the compression spring 5 without the need to press the pushbutton 6. Upon arrival of the headrest-supporting tube 11 at the usable position, the portions of the locking portions 43 of the position-limiting member 4 move from the ends of the inclined side surfaces 223, 233 corresponding to the thick ends of the first and second curved walls 22, 23 into the first position-limiting groves 20 with the assistance of the compression spring 5, thereby locking the headrest-supporting tube 11 at the usable position. As such, the headrest-supporting tube 11 is biased toward the folded position by the compression spring 5.

The second pivot member 3 further includes a sealing cover 36 disposed fixedly on the annular flat wall 311 of the second pivot member 3 for confining the shaft 7 within the first and second receiving holes 27, 37.

In view of the above, by operating simply the pushbutton 6, the headrest-supporting tube 11 can be rotated from the usable position to the folded position to reduce the space occupied by the folded stroller 1. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A headrest-adjusting mechanism adapted for use with a stroller, the stroller including a headrest-supporting tube and a backrest-supporting tube, said headrest-adjusting mechanism being adapted to be connected between the headrest-supporting tube and the backrest supporting tube in such a manner to allow for rotation of the headrest-supporting tube relative to the backrest-supporting tube from a usable position to a folded position in a predetermined direction, said headrest-adjusting mechanism comprising:

a first pivot member adapted to be connected to the headrest-supporting tube and including a first pivot body, said first pivot body having an inner side surface formed with a first retaining groove, and a first position-limiting groove in spatial communication with said first retaining groove;

a second pivot member pivotally connected to said first pivot member, said second pivot member being adapted to be connected to the backrest-supporting tube and including a second pivot body, said second pivot body having an inner side surface formed with a second retaining groove, and a second position-limiting groove in spatial communication with said second retaining groove;

a position-limiting member disposed movably within an assembly of said first and second retaining grooves and having at least one locking portion, said position-limiting member being biased to a position wherein said locking portion of said position-limiting member is disposed within said first position-limiting groove in said first pivot member and said second position-limiting groove in said second pivot member to lock said first and second pivot members relative to each other, said locking portion of said position-limiting member as a whole being removable from said first position-limiting groove so as to induce for rotation of the headrest-supporting tube relative to the backrest-supporting tube from said usable position to said folded position; and a resilient member disposed within said second retaining groove in said second pivot member for biasing said position-limiting member away from said second pivot member, and a pushbutton operable to translate along an axis to thereby push and remove said locking portion of said position limiting member from said first position-limiting groove so as to allow for relative rotation between said first and second pivot members.

2. The headrest-adjusting mechanism as claimed in claim 1, wherein said first pivot member includes a retaining block, and said second pivot member includes a limiting projection that is positioned such that, when the headrest-supporting tube is at the usable position, said retaining block abuts against said limiting projection, so that the headrest-supporting tube is limited to rotate from the useable position relative to the backrest-supporting tube in the predetermined direction.

3. The headrest-adjusting mechanism as claimed in claim 2, wherein the predetermined direction is a rearward direction.

4. The headrest-adjusting mechanism as claimed in claim 1, wherein said inner side surface of said first pivot body of said first pivot member is further formed with a first curved wall and a second curved wall that define cooperatively said first retaining groove therebetween, each of said first and second curved walls having an inclined side surface permitting said locking portion of said position-limiting member to be biased by said resilient member to be in slidable contact therewith such that, said locking portion of said position-limiting member moves on said inclined side surfaces of said first and second curved walls to result in movement of said locking portion as a whole into said second retaining groove.

5. The headrest-adjusting mechanism as claimed in claim 4, wherein said locking portion of said position-limiting member is pushed by said resilient member into contact with said inclined side surfaces of said first and second curved walls to thereby bias said headrest-supporting tube toward said folded position.

6. The headrest-adjusting mechanism as claimed in claim 4, wherein said headrest-supporting tube is rotatable forcibly from said folded position to said usable position against the biasing action of said resilient member to thereby allow for relative rotation between said first and second pivot members.

7. The headrest-adjusting mechanism as claimed in claim 1, wherein said position-limiting member has an annular body disposed within the assembly of said first and second retaining grooves, said locking portion extending radially and outwardly from said annular body.

8. The headrest-adjusting mechanism as claimed in claim 1, wherein said first pivot body of said first pivot member further has an annular shoulder disposed in said first retaining groove, and said second pivot body of said second pivot member further has a loop-shaped flange disposed within said second retaining groove and abutting against said annular shoulder at an end thereof.

9. The headrest-adjusting mechanism as claimed in claim 8, wherein said resilient member is configured as a coiled compression spring that is sleeved on said loop-shaped flange of said second pivot member.

10. The headrest-adjusting mechanism as claimed in claim 1, wherein said first pivot body of said first pivot member further has an annular rib disposed in said first retaining groove, and said position-limiting member has an annular shoulder abutting against said annular rib of said first pivot body.

11. A stroller comprising:
a headrest-supporting tube;
a backrest-supporting tube; and
a headrest-adjusting mechanism connected between said headrest-supporting tube and said backrest-supporting tube in such a manner to allow for rotation of said headrest-supporting tube relative to said backrest-supporting tube from a usable position and a folded position in a predetermined direction, said headrest-adjusting mechanism including:

a first pivot member connected to said headrest-supporting tube and including a first pivot body said first pivot body having an inner side surface formed with a first retaining groove, and a first position-limiting groove in spatial communication with said first retaining groove, a second pivot member pivotally connected to said first pivot member, said second pivot member being connected to said backrest-supporting tube and including a second pivot body, said second pivot body having an inner side surface formed with a second retaining groove, and a second position-limiting groove in spatial communication with said second retaining groove, a position-limiting member disposed movably within an assembly of said first and second retaining grooves and having at least one locking portion, said position-limiting member being biased to a position wherein said locking portion of said position-limiting member is disposed within said first position-limiting groove in said first pivot member and said second position-limiting groove in said second pivot member to lock said first and second pivot members relative to each other, said locking portion of said position-limiting member as a whole being removable from said first position-limiting groove so as to allow for rotation of said headrest-supporting tube relative to said backrest-supporting tube between said usable position and said folded position, and a resilient member disposed within said second retaining groove in said second pivot member for biasing said position-limiting member away from said second pivot member, and a pushbutton operable to translate along an axis to thereby push and remove said locking portion of said position-limiting member from said first position-limiting groove so as to allow for relative rotation between said first and second pivot members.

12. The stroller as claimed in claim 11, wherein said first pivot member includes a retaining block, and said second pivot member includes a limiting projection that is positioned such that, when the headrest-supporting tube is at the usable position, said retaining block abuts against said limiting projection, so that the headrest-supporting tube is limited to rotate from the useable position relative to the backrest- supporting tube in the predetermined direction.

13. The stroller as claimed in claim 12, wherein the predetermined direction is a rearward direction.

14. The stroller as claimed in claim 11, wherein said inner side surface of said first pivot body of said first pivot member is further formed with a first curved wall and a second curved wall that define cooperatively said first retaining groove therebetween, each of said first and second curved walls having an inclined side surface permitting said locking portion of said position-limiting member to be biased by said resilient member to be in slidable contact therewith such that, when said headrest-supporting tube is rotated forcibly from said folded position to said usable position against the biasing action of said resilient member, said locking portion of said position-limiting member moves on said inclined side surfaces of said first and second curved walls to result in movement of said locking portion as a whole into said second retaining groove, thereby allowing for relative rotation between said first and second pivot members.

15. The stroller as claimed in claim 14, wherein said locking portion of said position-limiting member is pushed by said resilient member into contact with said inclined side surfaces of said first and second curved walls to thereby bias said headrest- supporting tube toward said folded position.

16. The stroller as claimed in claim 11, wherein said first pivot body of said first pivot member further has an annular shoulder disposed in said first retaining groove, and said second pivot body of said second pivot member further has a loop-shaped flange disposed within said second retaining groove and abutting against said annular shoulder at an end thereof.

17. The stroller as claimed in claim 11, wherein said first pivot body of said first pivot member further has an annular rib disposed in said first retaining groove, and said position-limiting member has an annular shoulder abutting against said annular rib of said first pivot body.

* * * * *